United States Patent
Wieres

(10) Patent No.: US 6,458,329 B1
(45) Date of Patent: *Oct. 1, 2002

(54) HONEYCOMB BODY BONDED ONLY PARTIALLY TO A JACKET TUBE

(75) Inventor: Ludwig Wieres, Overath (DE)

(73) Assignee: Emitec Gesellschaft fuer Emissionstechnologie mbH, Lohmar (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,817

(22) Filed: Sep. 2, 1997

Related U.S. Application Data

(63) Continuation of application No. PCT/EP96/00562, filed on Feb. 9, 1996.

(30) Foreign Application Priority Data

Mar. 2, 1995 (DE) .......................................... 195 07 299

(51) Int. Cl.$^7$ .............................. F01N 3/28; B23K 1/00; B01D 53/92
(52) U.S. Cl. ....................... 422/180; 422/177; 422/211; 422/222
(58) Field of Search ................................. 422/171, 174, 422/177, 180, 179, 221, 211, 222; 502/439; 60/299, 300

(56) References Cited

U.S. PATENT DOCUMENTS

| | | | | |
|---|---|---|---|---|
| 4,832,998 A | * | 5/1989 | Cyron | 428/116 |
| 5,102,743 A | * | 4/1992 | Maus et al. | 502/439 |
| 5,366,700 A | * | 11/1994 | Humpolik et al. | 422/180 |
| 5,419,878 A | * | 5/1995 | Honma | 422/177 |

FOREIGN PATENT DOCUMENTS

DE 4306052 * 9/1993

* cited by examiner

Primary Examiner—Hien Tran
(74) Attorney, Agent, or Firm—Laurence A. Greenberg; Werner H. Stemer; Ralph E. Locher

(57) ABSTRACT

A honeycomb body is used, in particular, for an apparatus for the catalytic conversion of exhaust gases in an exhaust system, especially an exhaust system of an internal combustion engine, preferably an Otto engine. The honeycomb body is surrounded by a smooth portion of a metal layer that extends over a part of an axial length of the honeycomb body. The layer is an integral component of the honeycomb body and is located in axial subregions between the honeycomb body and a jacket tube. Undesired brazed connections between the honeycomb body and the jacket tube are avoided in these axial subregions, regardless of the brazing material application method that is employed.

4 Claims, 3 Drawing Sheets

HONEYCOMB BODY BONDED ONLY PARTIALLY TO A JACKET TUBE

CROSS-REFERENCE TO RELATED APPLICATION

This application is a continuation of International Application Serial No. PCT/EP96/00562, filed Feb. 9, 1996.

BACKGROUND OF THE INVENTION

FIELD OF THE INVENTION

The invention relates to a honeycomb body, particularly for an apparatus for catalytic conversion of exhaust gases in an exhaust system, in particular for an exhaust system of an internal combustion engine, preferably an Otto engine. The honeycomb body, through which an exhaust gas can flow, is disposed in a jacket tube and has flow channels that are formed between adjacent wound or stacked metal layers, at least some of which are structured. The honeycomb body is brazed to the jacket tube over only part of its axial length.

One such honeycomb body is known from German Published, Non-Prosecuted Patent Application DE 29 24 592 A1. In order to connect the honeycomb body to the jacket tube, German Published, Non-Prosecuted Patent Application DE 29 24 592 A1 proposes, among other things, that the end surfaces of the honeycomb body disposed in the jacket tube be dipped in an immersion bath for a binder, thus producing wetted zones. A brazing material coating is produced by applying brazing material from a reservoir of powdered brazing material through a sieve onto the wetted end surface. The thus-coated honeycomb body is brazed to the jacket tube in a vacuum or in a protective gas atmosphere.

It is also known from German Published, Non-Prosecuted Patent Application DE 29 24 592 A1 to dip the end surfaces of the honeycomb body disposed in the jacket tube in molten brazing material.

A honeycomb body which is disposed in a jacket tube and through which an exhaust gas can flow is known from German Published, Non-Prosecuted Patent Application DE 43 06 052 A1, corresponding to U.S. Pat. No. 5,419,878. The honeycomb body is formed of a smooth and a corrugated metal layer, which are spirally rolled while touching each other so that flow channels are formed between the metal layers. The smooth metal layer is thereby located on the outside. In order to provide a reliable brazing connection to the jacket tube, the smooth metal layer is constructed with several openings at equally distanced locations along the outer circumference.

A method for brazing carrier bodies of catalytic converters is known from Published International Patent Application WO 93/12908. The application of a brazing material to the metal layers of the honeycomb body is carried out by first dispersing a powdered brazing material of suitable particle size in a liquid mixture of binder material and liquid, and then flooding the flow channels of the honeycomb body. Excess mixture is removed from the flow channels after the flooding.

Both German Published, Non-Prosecuted Patent Application DE 29 24 592 A1 and Published International Patent Application WO 93/12908 use methods for producing a carrier body in which the outer region of the honeycomb body is brazed to the jacket tube. That produces a rigid connection between the honeycomb body and the jacket tube.

It is already known from Published International Patent Application WO 94/06594 to braze a honeycomb body to a jacket tube only in an axial subregion, by providing the jacket tube with brazing material from the inside in the subregion to be brazed and then thrusting the honeycomb body into the jacket tube.

In a further method for applying brazing material to a honeycomb body, which is known from Published International Patent Application WO 93/25339, corresponding to U.S. Pat. No. 5,431,330, brazing material is introduced into a honeycomb body from the end surfaces.

Most of the known brazing material application methods, and especially those in which brazing material is applied from the direction of the end surfaces, produce results in which not only are the metal layers of the honeycomb body brazed to one another, but there are also connections between the honeycomb body and the jacket tube. That is particularly true in honeycomb bodies built up from a plurality of metal layers extending approximately spirally or in an involute manner, but it is also true of spirally wound honeycomb bodies with a corrugated outer layer. The desired binding of the honeycomb body to the jacket tube only in a certain axial subregion cannot be achieved without problems in conjunction with such brazing material application methods. Often, additional connections between the honeycomb body and the jacket tube are created, especially at the end surfaces.

Since the honeycomb body and the jacket tube behave differently in terms of thermal expansion, a continuous rigid connection between the honeycomb body and the jacket tube is undesirable. Such a connection can allow thermal strains that can damage the honeycomb body to occur in the honeycomb body.

SUMMARY OF THE INVENTION

It is accordingly an object of the invention to provide a honeycomb body bonded only partially to a jacket tube, which overcomes the hereinafore-mentioned disadvantages of the heretofore-known devices of this general type and which improves the known apparatus for catalytic conversion of exhaust gases in such a way that brazing of the honeycomb body to the jacket tube in certain axial regions is avoided, regardless of the brazing material application technique.

With the foregoing and other objects in view there is provided, in accordance with the invention, a honeycomb body disposed in a jacket tube and having an axial length and end surfaces; the honeycomb body being brazed to the jacket tube over a part of the axial length; the honeycomb body having mutually adjacent, at least partially structured wound or stacked metal layers and flow channels formed between the mutually adjacent metal layers for conducting an exhaust gas flow; and at least one of the layers having at least one smooth portion at least partially surrounding the honeycomb body and extending from at least one of the end surfaces over a part of the axial length.

The honeycomb body according to the invention, which is preferably suitable for an apparatus for catalytic conversion of exhaust gases in an exhaust system, is distinguished in that at least one layer of the honeycomb body has at least one smooth portion at least partially surrounding the honeycomb body and extending from at least one end surface over a part of the axial length of the honeycomb body. The smooth portion forms an outer layer on the circumference of the honeycomb body that rests on the jacket tube. Since the smooth portion rests on the jacket tube, no brazing material (or only slight amounts of brazing material) can travel between the smooth portion and the jacket tube, regardless of the brazing material application method employed. The application of the brazing material can be carried out in the manner known from the prior art. Joining of the honeycomb body to the jacket tube is carried out over a part of the axial length of the jacket tube, and the smooth portion extends axially of the honeycomb body only as far as the connection region between the honeycomb body and the jacket tube.

As a result, thermal expandability in the axial direction of the honeycomb body is attained, since the honeycomb body now is connected with the jacket tube only within one or more connection regions. No undesired brazing of the honeycomb body to the jacket tube takes place over the remainder of the honeycomb body and the jacket tube.

The smooth portion may be part of a smooth layer that is a component of the honeycomb body.

In accordance with another feature of the invention, one layer of the honeycomb body has a first smooth portion and a second smooth portion, each extending from the end surfaces over a part of the axial length of the honeycomb body, at most as far as a connection region between the honeycomb body and the jacket tube, and at least partially surrounding the honeycomb body. As a result of this provision, brazing material can be applied from one or both of the end surfaces of the honeycomb body, without creating a connection between the outer layer of the honeycomb body and the jacket tube. Another advantage of this embodiment is that in the manufacture of such a honeycomb body, even when brazing material is applied to only one side, it does not matter from which end surface the brazing material is introduced into a honeycomb body. This simplifies the manipulation and manufacture of such a honeycomb body.

In accordance with a further feature of the invention, the honeycomb body includes a stack of layers at least some of which are structured, the ends of the stack are each entwined in opposite directions about at least two fixed points, and two metal layers each have at least one smooth portion extending from at least one end surface over a part of the axial length of the honeycomb body and surrounding the honeycomb body. The layers can each form the topmost or bottommost layer of the stack. It is also possible for such layers to be disposed inside the stack. An embodiment is preferred in which the smooth portion or portions are constructed on a metal layer which is disposed in the vicinity of the middle of the stack. This has the advantage of attaining the desired success in the case of an S-shaped entwined honeycomb body with a single layer.

In accordance with an added feature of the invention, the smooth portion partially overlaps in the circumferential direction. This assures that the outer layer of the honeycomb body formed by the smooth portion is complete, so that a brazing agent cannot enter between the smooth portion and the jacket tube.

In accordance with a concomitant feature of the invention, the at least one smooth portion includes at least two smooth portions together entirely wrapping around the honeycomb body in circumferential direction.

Other features which are considered as characteristic for the invention are set forth in the appended claims.

Although the invention is illustrated and described herein as embodied in a honeycomb body bonded only partially to a jacket tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
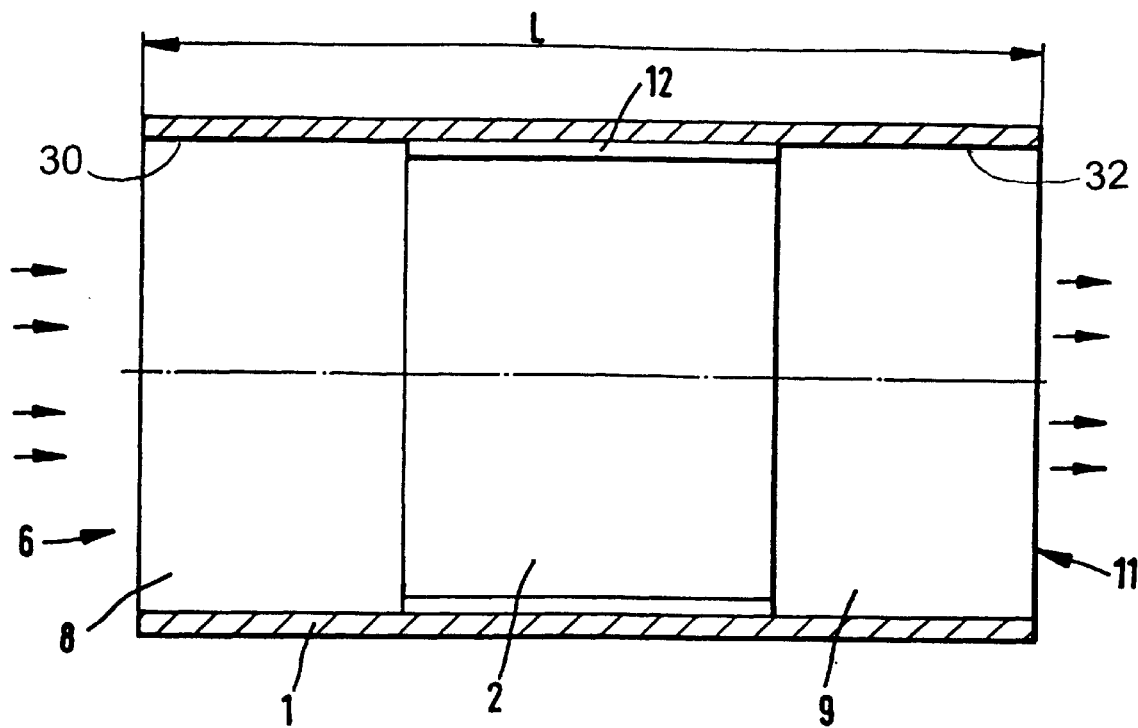
FIG. 1 is a diagrammatic, longitudinal-sectional view of a honeycomb body with a jacket tube.
Figure 2:
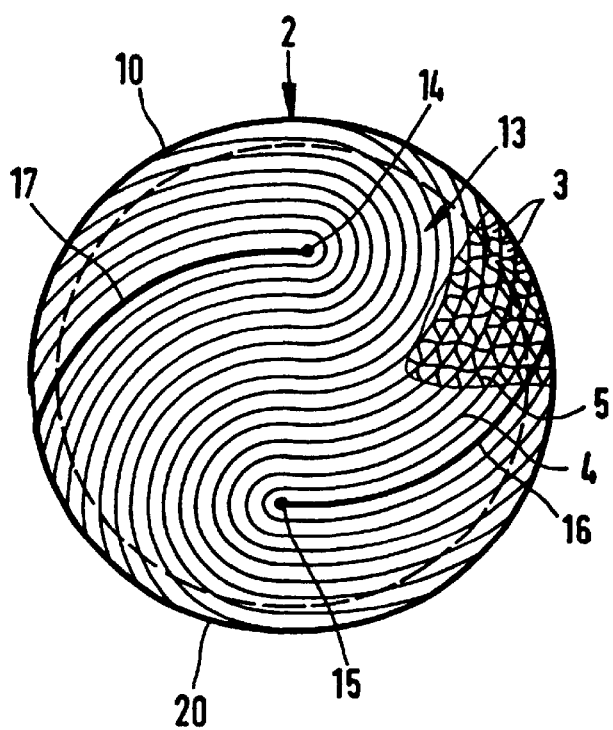
FIG. 2 is a cross-sectional view of a honeycomb body entwined in an S.

Referring now to the figures of the drawings in detail and first, particularly, to FIG. 1 thereof, there is seen a diagrammatic illustration of an apparatus for catalytic conversion of exhaust gases in an exhaust system, in particular for an exhaust system of an internal combustion engine, preferably an Otto engine. The apparatus includes a honeycomb body 2 which is disposed in a jacket tube 1 and through which an exhaust gas can flow. As is seen in FIG. 2, the honeycomb body 2 has flow channels 3 that are formed between adjacent smooth metal layers 4 and structured, preferably corrugated metal layers 5. The honeycomb body 2 is joined to the jacket tube 1 over a part of its axial length L. In FIG. 1, a connection region between the honeycomb body 2 and the jacket tube 1 is indicated by reference numeral 12.

The honeycomb body 2 has a first smooth portion 8 and a second smooth portion 9 on a metal layer 5. These portions 8, 9 each surround the honeycomb body 2 in the circumferential direction. The first portion 8 and the second portion 9 each extend in longitudinal direction of the honeycomb body from a respective end surface 6 and 11. They extend at most as far as the connection region 12 between the honeycomb body 2 and the jacket tube 1. The first smooth portion 8 and the jacket tube 1 form a contact region 30, and the second smooth portion 9 and the jacket tube 1 form a contact region 32.

A second exemplary embodiment of a honeycomb body 2 is shown in FIG. 2. The jacket tube 1 has not been shown in FIGS. 2–5 for the sake of better clarity. The honeycomb body 2 includes a stack 13 of smooth metal layers 4 and corrugated metal layers 5. Ends of the stack 13 are each entwined in opposite directions about fixed points 14, 15. Two metal layers 16, 17, each of which have a respective smooth portion 10, 20, are disposed in the honeycomb body 2. The smooth layers 16, 17 form outer layers of the stack 13.

The smooth portions 10, 20 each extend as far as the respective adjoining portion 10 and 20 of the respective layer 16 and 17.

Figure 3:
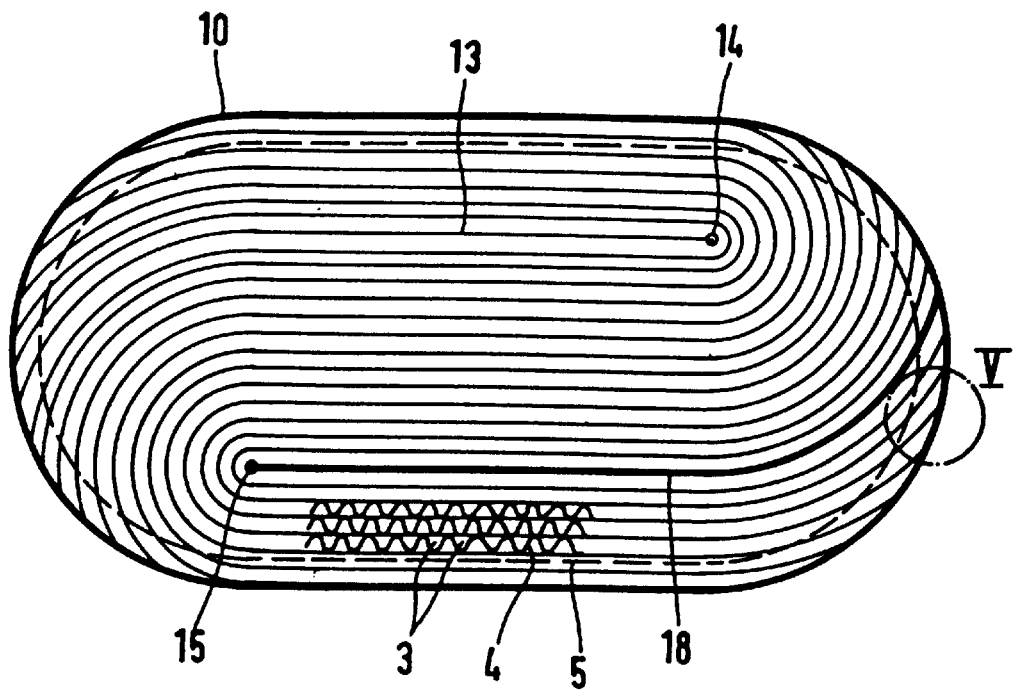
FIG. 3 is a cross-sectional view of a structure of a honeycomb body of elongated cross section.

FIG. 3 shows a third exemplary embodiment of a honeycomb body. This honeycomb body again includes a stack 13 of the layers 4, 5, which form the flow channels 3 in the honeycomb body 2. The stack 13 is entwined about the fixed points 14, 15. A metal layer 18 which has a smooth portion 10 is disposed in the stack 13. The smooth portion 10 is dimensioned in such a way that it extends over the entire circumference of the honeycomb body.

Figure 4:
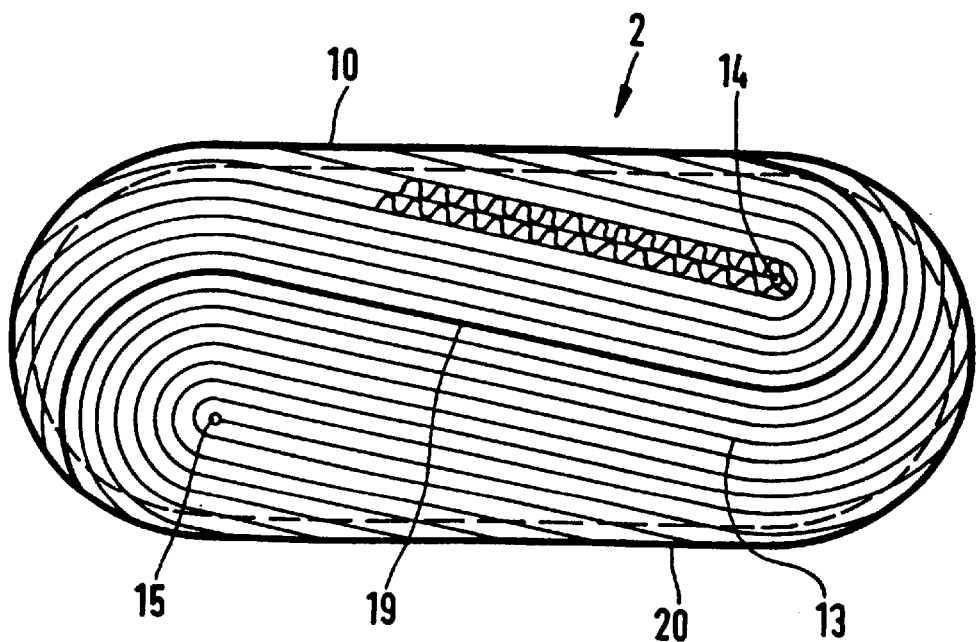
FIG. 4 is a cross-sectional view of a honeycomb body of elongated cross section.

FIG. 4 shows a fourth embodiment of the invention. A metal layer 19 which has smooth portions 10, 20 is disposed approximately centrally within the stack 13. The smooth portions 10, 20 entirely surround the honeycomb body 2 over its circumference.

Figure 5:
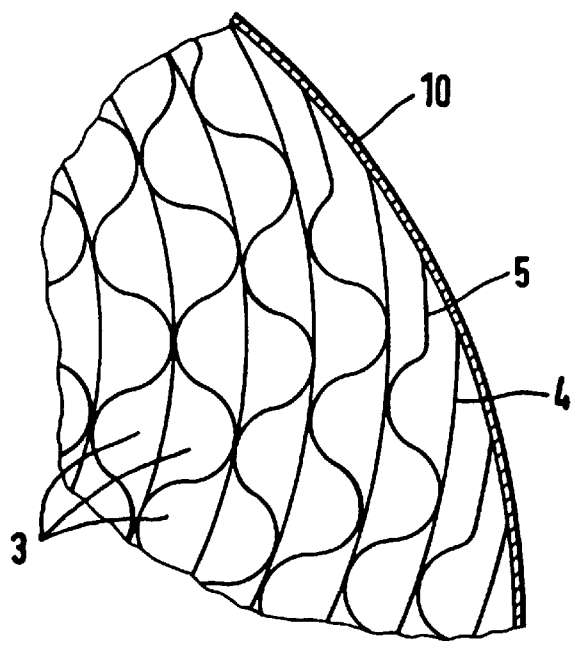
FIG. 5 is an enlarged, fragmentary, cross-sectional view of a portion V of a peripheral region of the honeycomb body of FIG. 3.

The enlarged illustration of FIG. 5 shows how the smooth portion 10 in the region V of FIG. 3 rests on the layers 4, 5 of the layer stack 13.

Figure 6:
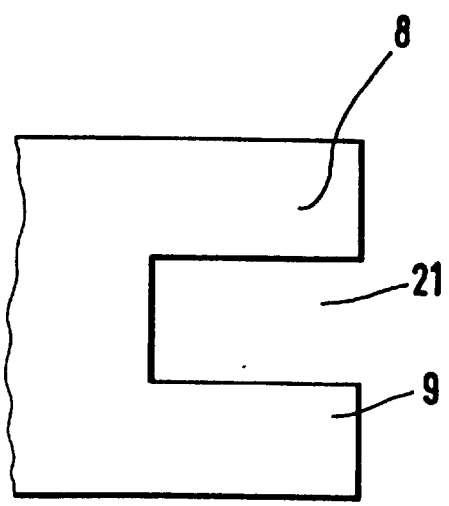
FIG. 6 is a fragmentary, elevational view of a first embodiment of a smooth portion.
Figure 7:
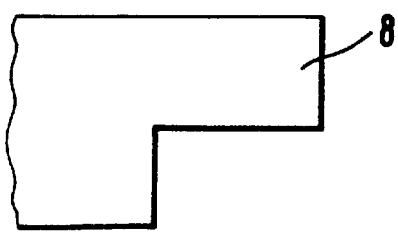
FIG. 7 is a fragmentary, elevational view of a second embodiment of a smooth portion.

FIGS. 6 and 7 show portions 8, 9 constructed on one layer 4, 5. In the embodiment of FIG. 6, a recess 21 which is formed between the portions 8, 9 exposes the connection region 12 of the honeycomb body 2 to the jacket tube 1. Additional smooth portions which may also be provided, are spaced apart from one another with the interposition of recesses. The geometry of the smooth portions may be adapted to suit the form of the connection region.

I claim:

1. An exhaust gas conduction apparatus, comprising:

a jacket tube; and a honeycomb body disposed in said jacket tube and having an axial length and end surfaces;

a connection region defined by a part of said axial length of said honeycomb body that is brazed to said Jacket tube;

said honeycomb body having a multiplicity of mutually adjacent stacked metal sheets having end portions and flow channels formed between said mutually adjacent metal sheets for conducting an exhaust gas flow, said sheets disposed in a stack having a middle and having ends entwined in opposite directions about at least two fixed points;

at least one of said sheets having at least one non-corrugated portion at least partially surrounding said honeycomb body and extending from at least one of said end surfaces over only a part of said axial length, said non-corrugated portion and said jacket tube forming a contact region preventing thermal strains in said honeycomb body, said non-corrugated portion substantially directly resting against said jacket tube in contact region, said contact region delimiting said connection region.

2. The apparatus according to claim 1, wherein said at least one non-corrugated portion of at least one of said sheets includes a first non-corrugated portion and a second non-corrugated portion, each extending from a respective one of said end surfaces over a part of said axial length, at most as far as said connection region, and at least partially surrounding said honeycomb body.

3. The apparatus according to claim 1, wherein said at least one non-corrugated portion is disposed on one of said sheets disposed in the vicinity of said middle of said stack.

4. The apparatus according to claim 1, wherein said at least one non-corrugated portion includes at least two non-corrugated portions together entirely wrapping around said honeycomb body in circumferential direction.

* * * * *